United States Patent [19]
Gates

[11] Patent Number: 5,948,312
[45] Date of Patent: Sep. 7, 1999

[54] SKIMMER SYSTEM

[75] Inventor: Donald P. Gates, Amherst, N.H.

[73] Assignee: Shipley Company, L.L.C., Marlborough, Mass.

[21] Appl. No.: 08/984,787

[22] Filed: Dec. 4, 1997

[51] Int. Cl.$^6$ .................................................. C22B 25/06
[52] U.S. Cl. ........................ 222/590; 222/593; 266/228
[58] Field of Search ............................. 420/590; 266/200, 266/237, 227, 229, 228; 222/593, 592, 590

[56] References Cited

U.S. PATENT DOCUMENTS 5,388,756  2/1995  Howlett .
5,707,585  1/1998  Ward et al. .

OTHER PUBLICATIONS

Patent Abstracts of Japan, vol. 13, No. 442 (C–641), Oct. 3, 1989 & JP 01 168826 A (Toyo Denshi Kogyo KK), Jul. 4, 1989.
Derwent Info Ltd., Patent Abstract of Japanese Patent No. 1–168826, Apr. 1989.

*Primary Examiner*—Scott Kastler
*Attorney, Agent, or Firm*—Darryl P. Frickey; Peter F. Corless

[57] ABSTRACT

A system and process for decontaminating solder which includes a linking pipe with an internal heater in the path of solder flow into a skim tank and transfer pump and valves for moving decontaminated solder from the skim tank into a standby tank which in turn is able to provide decontaminated solder to a solder machine or back to the skim tank in order to test the system.

13 Claims, 1 Drawing Sheet

SKIMMER SYSTEM

BACKGROUND OF THE INVENTION

There are presently in use in connection with the construction of printed circuit boards various soldering systems. One of the major soldering processes is the Hot Air Solder Leveling process known as the HASL process. Solder machines using the process are sold by various companies, e.g., Teledyne and Cemco. As the solder is used in such HASL process, it becomes contaminated with copper impurities and it is no longer useful and thus must be replenished.

In certain cases, the copper laden solder is sent to a reclaimer for removal of the impurity and new solder is used. This requires personnel time to physically replace the solder and also results in equipment down time. This is clearly not a cost effective way of handling the situation because of the expense of the new solder in comparison to what is paid by the recycler to the company.

Other methods have been proposed for use in removing copper from the solder. See U.S. Pat. No. 5,388,756 which discloses a continuous system. Also note the Japanese Patent No. 1-168826 described in this U.S. Pat. No. 5,388,756. In general, the way the continuous system operates as disclosed in U.S. Pat. No. 5,388,756, copper removal is not as great as is desirable and results in more new solder having to be added at greater cost to replenish the solder in the HASL machine.

Another system operating on a non-continuous basis has been proposed and has been sold in the USA. The system was designed by the AEA (a UK government agency) and utilizes two skimming tanks and an exterior heated linking pipe connected to the HASL machine.

This system attempts to control flow to the skimming operation in two tanks so that cleaned solder can be made available to the HASL system. However, this system has resulted in difficulties in maintenance as well as less than desirable flow of spent solder through the linking pipe thereof, i.e., the pipe connected between the HASL machine and the tanks. Because of the nature of the construction of the linking pipe and external heating system therefore and the inability to keep the solder at about 500° F. throughout the linking pipe as constructed, solidification of the solder has sometimes developed in the linking pipe with resultant incomplete transfer of copper contaminated solder.

Accordingly a new and improved system was needed to efficiently and more cost effectively remove copper contaminants from solder.

Additionally, a new and improved system was required that could be tested in the field without interfering with HASL operation. Further a new and improved linking pipe was needed which would be able to maintain solder flow between the HASL and the copper decontamination system. The present invention provides a system which meets the requirements listed above.

BRIEF DESCRIPTION OF THE INVENTION

This invention relates to an on-site solder purification and recovery system. The solder skimmer of this invention saves money through the reclaiming and reuse of copper-contaminated solder from the hot air solder leveling (HASL) process. Contaminated solder from the HASL machine is transferred to a skim tank of the solder skimmer. Purified solder is preferably immediately returned to the HASL machine from the standby tank of the solder skimmer, so that down time for the HASL machine is less than 15 minutes.

The solder is purified by manual skimming at the optimum temperature. Copper-rich needles (crystals) are removed without significant dragout of molten solder. Experience has shown solder savings can be more than 90% compared to bath dilution with fresh solder, and much greater than other skimmers currently on the market. Return on investment is usually less than 12 months and is a function of the volume of solder used in the HASL process.

The system also includes a flexible transfer pipe with internal heater as well as new and improved valving and standby tank arrangement to facilitate field testing of the machine without having to effect HASL machine operation.

DETAILED DESCRIPTION OF THE INVENTION

Figure 1:
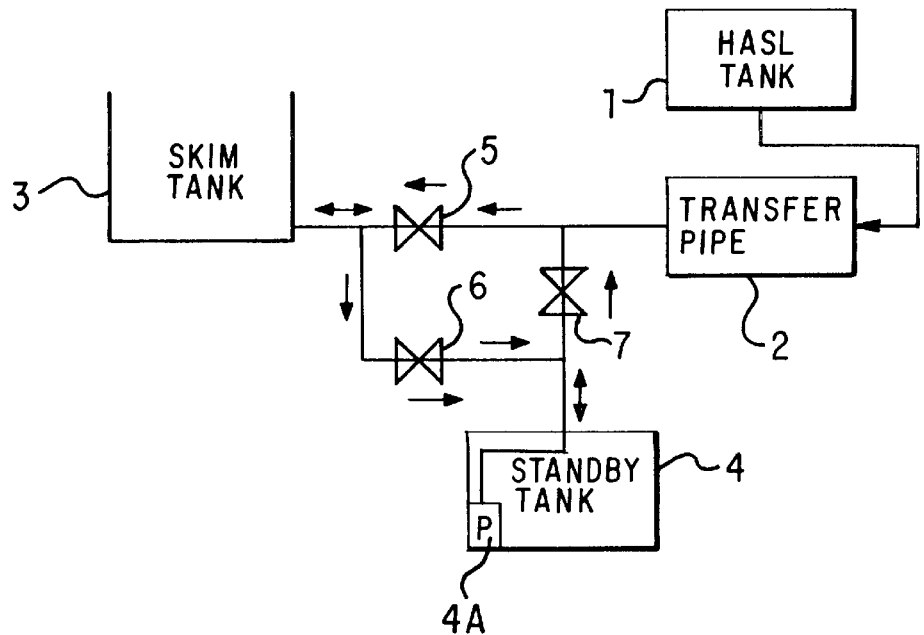
FIG. 1 shows the system of the present invention.

Reference should now be had to FIG. 1 for a description of the systems operation. At 1 there is shown in block form the HASL tank of a hot air solder leveling (HASL) machine. The solder in the HASL tank is used in providing the needs of the HASL solder machine. As the machine is used, the solder used in circuit board construction picks up copper from the boards and ultimately becomes contaminated with copper. Ultimately, the solder becomes too contaminated to be used and therefore has to be replenished with fresh solder.

With the system of this disclosure, in order to remove the copper contaminant from the solder in the HASL storage tank 1, solder is allowed to flow e.g., by gravity flow, through a transfer pipe 2 which maintains the solder in a molten state to a skim tank 3. Prior to this occurring skim tank 3 is empty and a standby tank 4 has purified solder stored therein for transfer to the HASL tank 1.

The contaminated copper is at this time allowed to move by gravity flow from HASL tank 1 and is directed via piping and a valve 5 which is now opened into a skim tank 3 for copper decontamination. At this time, valves shown at 6 and 7 are closed. Thereafter, the valve 5 is closed, the valve 6 is closed and valve 7 is opened so that purified molten solder in the standby tank can be pumped by a pump 4A positioned in the standby tank 4 to refill the HASL tank 1. It should be understood that a certain amount of fresh solder has to be added to replace solder used during processing in the HASL system and such may be added directly to the HASL tank 1 or may be added to the standby tank 4.

The skim tank 3 is now filled with copper contaminated solder and is at this time operated to cause formation of copper—x crystallized impurities, e.g., by reducing the temperature of the solder in the skim tank from about 500° F. to about 365° F. to 372° F. in approximately an hour. Solder is held at this lower temperature to form crystals for at least about 1.75 hours with at least about 2.0 to 3.0 hours being preferred. It should be understood that over 3 hours could be used, however it is not cost effective. In order to remove copper-x crystal impurities, a ⅛" to 3/16" mesh sieve is used by a worker to remove the copper-x crystals that are formed. The x in the crystals represent other impurities which also contaminate the solder and crystallize out as part of the copper crystal. It should also be understood that copper crystals without impurities may also be skimmed off. Accordingly, as used herein, copper enriched crystals are used to define crystals which are all copper or those which include copper and other chemicals.

After the solder in the skim tank 3 has been skimmed to substantially remove the copper impurities, the skim tank decontaminated solder held in the skim tank 3 flows by gravity through valve 6, which has been opened, into the standby tank 4 via the inactive pump 4A discharge pipe. At this time, both valves 5 and 7 remain closed.

It should be understood that conventional rod heater units (not shown) in the skim tank are used to heat the solder in the tanks 3 and 4 to 500° F. to maintain the solder in a molten state and to lower the temperature of the solder in the skim tank 3 to form copper crystals.

Pump 4A is preferably a centrifugal pump and is provided to permit flow of decontaminated solder from the standby tank 4 to the HASL tank 1 when needed. The valves 5, 6 and 7 are preferably air operated control valves constructed to be operated from a conventional control panel (not shown) as would be apparent to those skilled in the art.

Figure 2:
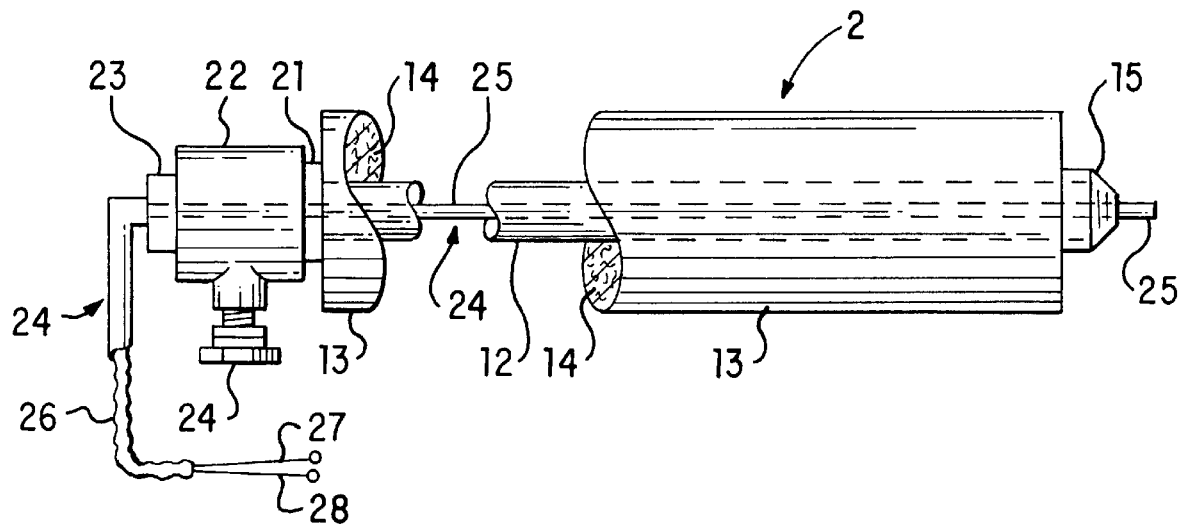
FIG. 2 shows the preferred transfer pipe of the present invention.

Reference should now be had to FIG. 2 which illustrates the preferred transfer pipe of this disclosure.

The transfer pipe is shown at 2 and is used to maintain the solder in a molten state preferably at a temperature of about 500° F. to prevent cold spots from forming and solidification of the solder flowing back and forth from the HASL tank 1 and the tanks 3 and 4.

In this disclosure, it has been found that the application of a cable heater 24 in the interior of the pipe having a tube 25 and in the path of the solder flow will prevent cold spots from forming and the resultant solidification of the solder.

The preferred transfer pipe construction is formed of a stainless steel corrugated hose 12 supported in an outer super-flex aluminum duct hose 13 which has fiberglass insulation 14 between the two hoses 12 and 13. The pipe ends 13 are provided with pipe connection 15 for coupling to the HASL. The pipe end supports the cable heater 25 and with the pipe connection 21 for coupling to a T connection 22 having a connection 24 for fluid flow into the piping coupled to the tanks 3 and 4. The solder will flow from the HASL tank 1 in the interior of the pipe over the cable heater tube 25. The cable heater tube 25 has a flexible metal conduit therein and two leads 27 and 28 to provide power to the heater element in the heater tube. The temperature of the heater is maintained to keep the solder at about 500° F. In order to do this, it is preferred that a conventional thermocouple temperature control (not shown) be placed on the exterior of pipe 12 be used to control the temperature of the cable heater.

As may be seen, the present invention provides a system which can be used in a self test mode without interfering with HASL operation. This can be done by the recirculating of solder in the standby tank 4 to the skim tank 3 and then putting the system through its paces.

While the above invention has been described based on the drawings, it is to be understood that modifications may be made to this system without departing from the spirit of the invention.

What is claimed:

1. A solder skimmer system comprising a standby tank for receiving solder,
    a skim tank,
    a linking pipe for providing contaminated solder to said skim tank from a HASL tank due to gravity flow, and
    a valve and piping arrangement comprising a valve for allowing contaminated solder to flow from said linking pipe to said skim tank, a valve for permitting purified solder to flow into said standby tank from said skim tank, and a valve for permitting flow of purified solder into said linking pipe or back towards said valve controlling flow into said skim tank.

2. The system of claim 1 in which said linking pipe includes a cable heater positioned in part in the interior of said linking pipe and positioned for contact with the solder which flows around it to maintain the solder in a flowable state.

3. The system of claim 2 in which said linking pipe comprises a corrugated metal hose.

4. The system of claim 3 in which a pump is coupled between said HASL tank and said standby tank to transfer purified solder to said HASL tank from said standby tank.

5. The system according to claim 1 in which said piping arrangement is constructed to allow decontaminated solder to flow by gravity flow from said skim tank to said standby tank.

6. A system comprising
    a HASL tank coupled to a solder skimmer system via a linking pipe thereof,
    the HASL tank providing solder from a tank thereof through the linking pipe to a solder skim tank of the solder skimmer system,
    the linking pipe having a heater element therein in the path of the solder, solder contacting the heater element as solder flows through the linking pipe to maintain the solder in a flowable state.

7. The system of claim 6 wherein the solder skimmer system has a standby tank for receiving purified solder from the skim tank, and a pump that can provide purified solder from the standby tank through the linking pipe to the HASL tank.

8. A solder system linking pipe assembly comprising a linking hose, a heater element positioned within the linking hose for fluid flow over the heater element, and a coupling apparatus that connects the linking hose to a solder machine.

9. The assembly of claim 8 wherein the heater element is positioned within a support apparatus within the linking hose.

10. The assembly of claim 8 wherein the linking hose is insulated.

11. A method for receiving copper contaminated solder from a HASL tank and returning purified solder to the HASL tank comprising:
    allowing movement of copper contaminated solder through a linking pipe comprising a heater apparatus, and then movement of the solder by gravity flow into a skim tank;
    forming copper enriched crystals in a skim tank and removing the crystals;
    moving the decontaminated solder into a standby tank; and
    moving decontaminated solder into the HASL tank after transfer of copper contaminated solder into the skim tank from the HASL tank.

12. The method of claim 11 wherein the heater apparatus is positioned within the linking pipe and solder flows over the heater apparatus.

13. A method for receiving copper contaminated solder from a HASL tank and returning purified solder to the HASL tank comprising:
    allowing movement of copper contaminated solder through a linking pipe comprising a heater apparatus, and then movement of the solder into a skim tank, the heater apparatus positioned within the linking pipe and solder flowing over the heater apparatus;
    forming copper enriched crystals in a skim tank and removing the crystals;
    moving the decontaminated solder into a standby tank; and
    moving decontaminated solder into the HASL tank after transfer of copper contaminated solder into the skim tank from the HASL tank.

* * * * *